(12) United States Patent
Chen

(10) Patent No.: US 10,895,628 B2
(45) Date of Patent: Jan. 19, 2021

(54) TRACKING SYSTEM, TRACKING DEVICE AND TRACKING METHOD

(71) Applicant: HTC Corporation, Taoyuan (TW)

(72) Inventor: Yuan-Tung Chen, Taoyuan (TW)

(73) Assignee: HTC CORPORATION, Taoyuan (TW)

( * ) Notice: Subject to any disclaimer, the term of this patent is extended or adjusted under 35 U.S.C. 154(b) by 430 days.

(21) Appl. No.: 15/857,826

(22) Filed: Dec. 29, 2017

(65) Prior Publication Data
US 2018/0188353 A1      Jul. 5, 2018

Related U.S. Application Data

(60) Provisional application No. 62/439,902, filed on Dec. 29, 2016.

(51) Int. Cl.
| | | |
|---|---|---|
| *G01S 3/80* | (2006.01) | |
| *G01S 5/30* | (2006.01) | |
| *G01S 5/16* | (2006.01) | |
| *G01S 11/14* | (2006.01) | |
| *G01S 5/18* | (2006.01) | |

(Continued)

(52) U.S. Cl.
CPC .................. *G01S 5/30* (2013.01); *G01S 5/16* (2013.01); *G01S 5/18* (2013.01); *G01S 5/20* (2013.01); *G01S 5/26* (2013.01); *G01S 11/12* (2013.01); *G01S 11/14* (2013.01); *G01S 15/876* (2013.01); *G06F 3/011* (2013.01); *G06F 3/017* (2013.01)

(58) Field of Classification Search
None
See application file for complete search history.

(56) References Cited

U.S. PATENT DOCUMENTS

| | | | | |
|---|---|---|---|---|
| 5,645,077 A | * | 7/1997 | Foxlin | A61B 5/1114 600/587 |
| 5,812,257 A | * | 9/1998 | Teitel | G01S 7/06 342/463 |

(Continued)

FOREIGN PATENT DOCUMENTS

| | | |
|---|---|---|
| WO | 2015/048890 A1 | 4/2015 |
| WO | 2017/030493 A1 | 2/2017 |

OTHER PUBLICATIONS

Devendra P. Garg and Manish Kumar, Sensor Modeling and Multi-Sensor Data Fusion, U. S. Army Research Office. pp. 6, 8. Aug. 26, 2005. (Year: 2005).*

(Continued)

*Primary Examiner* — Isam A Alsomiri
*Assistant Examiner* — Jonathan D Armstrong
(74) *Attorney, Agent, or Firm* — McClure, Qualey & Rodack, LLP

(57) ABSTRACT

A tracking system includes a first device and a second device. The second device comprises an optical module, an ultrasonic module and a processor. The optical module is configured to capture image data in a first detection field. The ultrasonic module is configured to collect ultrasonic data in a second detection field different from the first detection field. The processor is configured to determine a relative position of a target device relative to the tracking device in a third detection field according to the image data and the ultrasonic data. The third detection field is larger than the first detection field and larger than the second detection field.

13 Claims, 10 Drawing Sheets

(51) Int. Cl.
*G06F 3/01* (2006.01)
*G01S 15/87* (2006.01)
*G01S 11/12* (2006.01)
*G01S 5/20* (2006.01)
*G01S 5/26* (2006.01)

(56) References Cited

U.S. PATENT DOCUMENTS

| | | | | |
|---|---|---|---|---|
| 5,850,201 A * | 12/1998 | Lasko-Harvill | ......... | G06F 3/011 345/8 |
| 5,856,844 A * | 1/1999 | Batterman | ............. | G01S 5/163 345/158 |
| 6,172,657 B1 * | 1/2001 | Kamakura | .......... | G02B 27/017 345/8 |
| 6,757,068 B2 * | 6/2004 | Foxlin | ................. | G02B 27/017 356/139.03 |
| 7,034,779 B2 * | 4/2006 | Ebersole, Jr. | .......... | A62B 9/006 345/7 |
| 7,056,216 B2 * | 6/2006 | Ohshima | ................. | G06F 3/011 463/36 |
| 7,301,648 B2 * | 11/2007 | Foxlin | .................. | G02B 27/017 356/620 |
| 7,554,511 B2 * | 6/2009 | Fager | ..................... | A63F 13/10 345/7 |
| 7,602,301 B1 * | 10/2009 | Stirling | ................ | A61B 5/1127 340/573.1 |
| 7,610,558 B2 * | 10/2009 | Morita | .................. | G06T 19/006 463/32 |
| 7,716,008 B2 * | 5/2010 | Ohta | ....................... | A63F 13/10 702/152 |
| 7,774,155 B2 * | 8/2010 | Sato | ........................ | A63F 13/06 702/127 |
| 7,839,417 B2 * | 11/2010 | Ebensberger | ............ | G09B 9/00 345/419 |
| 8,094,090 B2 * | 1/2012 | Fisher | ................ | A63B 24/0006 345/8 |
| 8,179,604 B1 * | 5/2012 | Prada Gomez | .... | G02B 27/0093 345/8 |
| 9,323,055 B2 * | 4/2016 | Baillot | ................ | G02B 27/017 |
| 9,324,229 B2 * | 4/2016 | Baillot | ................ | G08B 25/016 |
| 9,682,320 B2 * | 6/2017 | Mao | ........................ | A63F 13/06 |
| 9,987,554 B2 * | 6/2018 | Stafford | ................ | A63F 13/213 |
| 10,073,516 B2 * | 9/2018 | Larsen | ................ | G02B 27/0093 |
| 10,086,282 B2 * | 10/2018 | Mao | ........................ | A63F 13/06 |
| 10,318,019 B2 * | 6/2019 | Banning | ................ | G06F 3/038 |
| 10,352,853 B2 * | 7/2019 | Shiono | ................ | A61B 5/0077 |
| 2006/0284792 A1 * | 12/2006 | Foxlin | .................. | G02B 27/017 345/8 |
| 2006/0287086 A1 | 12/2006 | Zalewski et al. | | |
| 2009/0187374 A1 | 7/2009 | Baxter et al. | | |
| 2010/0253601 A1 | 10/2010 | Seder et al. | | |

OTHER PUBLICATIONS

Extended European Search Report issued in corresponding European patent application dated May 24, 2018.

* cited by examiner

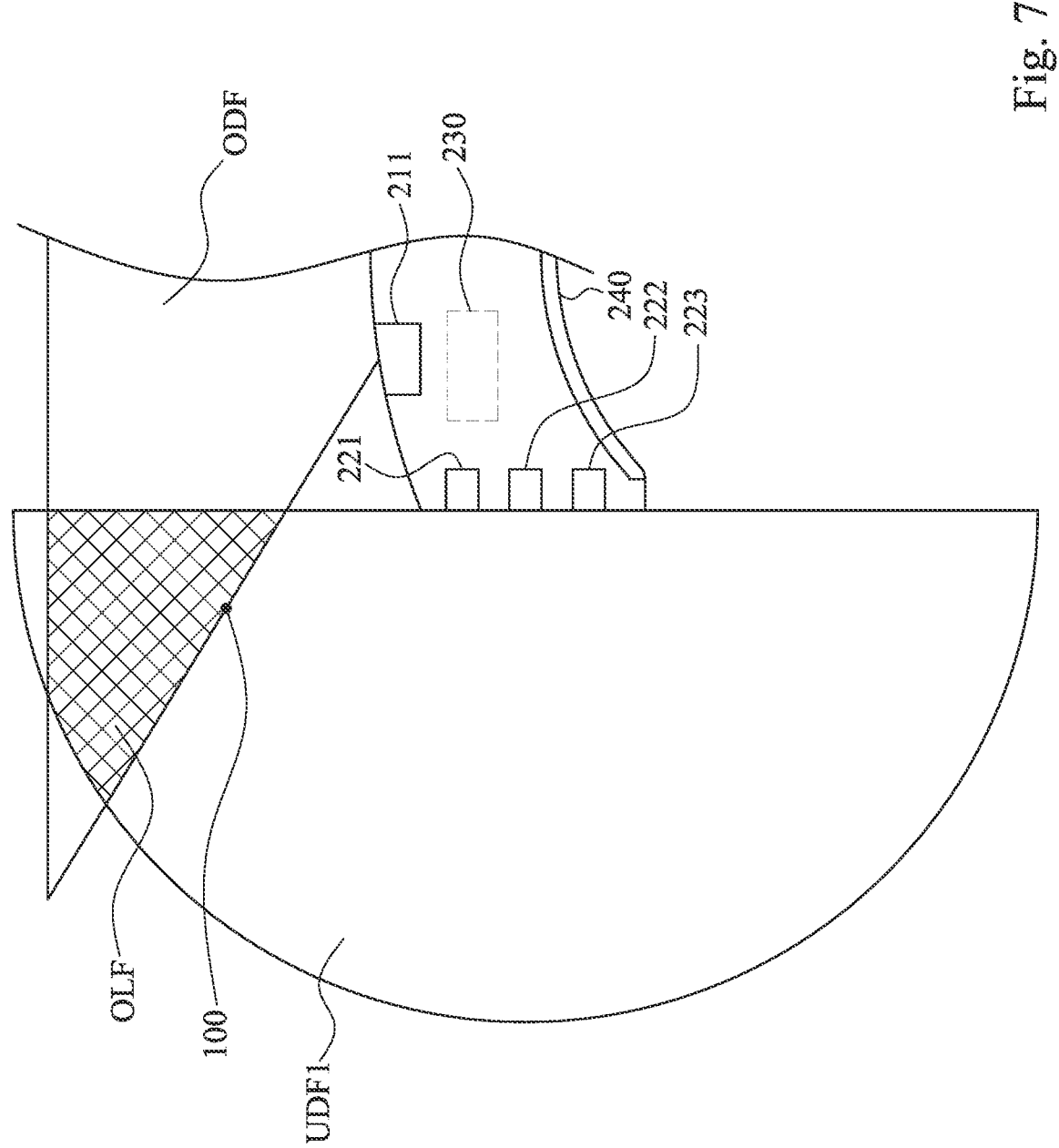

TRACKING SYSTEM, TRACKING DEVICE AND TRACKING METHOD

CROSS-REFERENCE TO RELATED APPLICATION

This application claims priority to U.S. Provisional Application Ser. No. 62/439,902, filed on Dec. 29, 2016, which is herein incorporated by reference.

BACKGROUND

Field of Invention

Present disclosure relates to a tracking system, a tracking device, and a tracking method. More particularly, present disclosure relates to a tracking system, a tracking device, and a tracking method using ultrasounds.

Description of Related Art

Nowadays, more and more electronic devices are capable of measuring relative distances by cameras. However, detection via cameras is limited by the field of views (FOVs) of the cameras. The detection accuracy can be influenced by the distortion when the FOV is high. On the other hand, camera-based detection requires high computation powers.

Apparently, using camera solely to measure distances in a long time is not an ideal approach. Therefore, improvements are required.

SUMMARY

Aiming to solve aforementioned problems, present disclosure provides a tracking system, a tracking device, and a tracking method.

The disclosure provides a tracking system. The tracking system comprises a first device and a second device. The second device comprises an optical module, an ultrasonic module and a processor. The optical module is configured to capture image data in a first detection field. The ultrasonic module is configured to collect ultrasonic data in a second detection field different from the first detection field. The processor is configured to determine a relative position of the first device relative to the second device in a third detection field according to at least one of the image data and the ultrasonic data. The third detection field is larger than the first detection field and larger than the second detection field.

Another aspect of disclosure is to provide a tracking device. The tracking device comprises an optical module, an ultrasonic module and a processor. The optical module is configured to capture image data in a first detection field. The ultrasonic module is configured to collect ultrasonic data in a second detection field different from the first detection field. The processor is configured to determine a relative position of a target device relative to the tracking device in a third detection field according to at least one of the image data and the ultrasonic data. The third detection field is larger than the first detection field and larger than the second detection field.

Another aspect of present disclosure is to provide a tracking method. The method comprises following steps: capturing, by an optical module of the second device, image data in a first detection field; collecting, by an ultrasonic module of the second device, ultrasonic data in a second detection field different from the first detection field; and determining, by a processor of the second device, a relative position of the first device relative to the second device in a third detection field according to at least one of the image data and the ultrasonic data, in which the third detection field is larger than the first detection field and larger than the second detection field.

It is to be understood that both the foregoing general description and the following detailed description are by examples, and are intended to provide further explanation of the disclosure as claimed.

BRIEF DESCRIPTION OF THE DRAWINGS

Present disclosure can be more fully understood by reading the following detailed description of the embodiment, with reference made to the accompanying drawings as follows:

FIG. 7 is a schematic diagram shows the tracking system operates in combined detection fields according to one embodiment of present disclosure.

DETAILED DESCRIPTION

Figure 1:
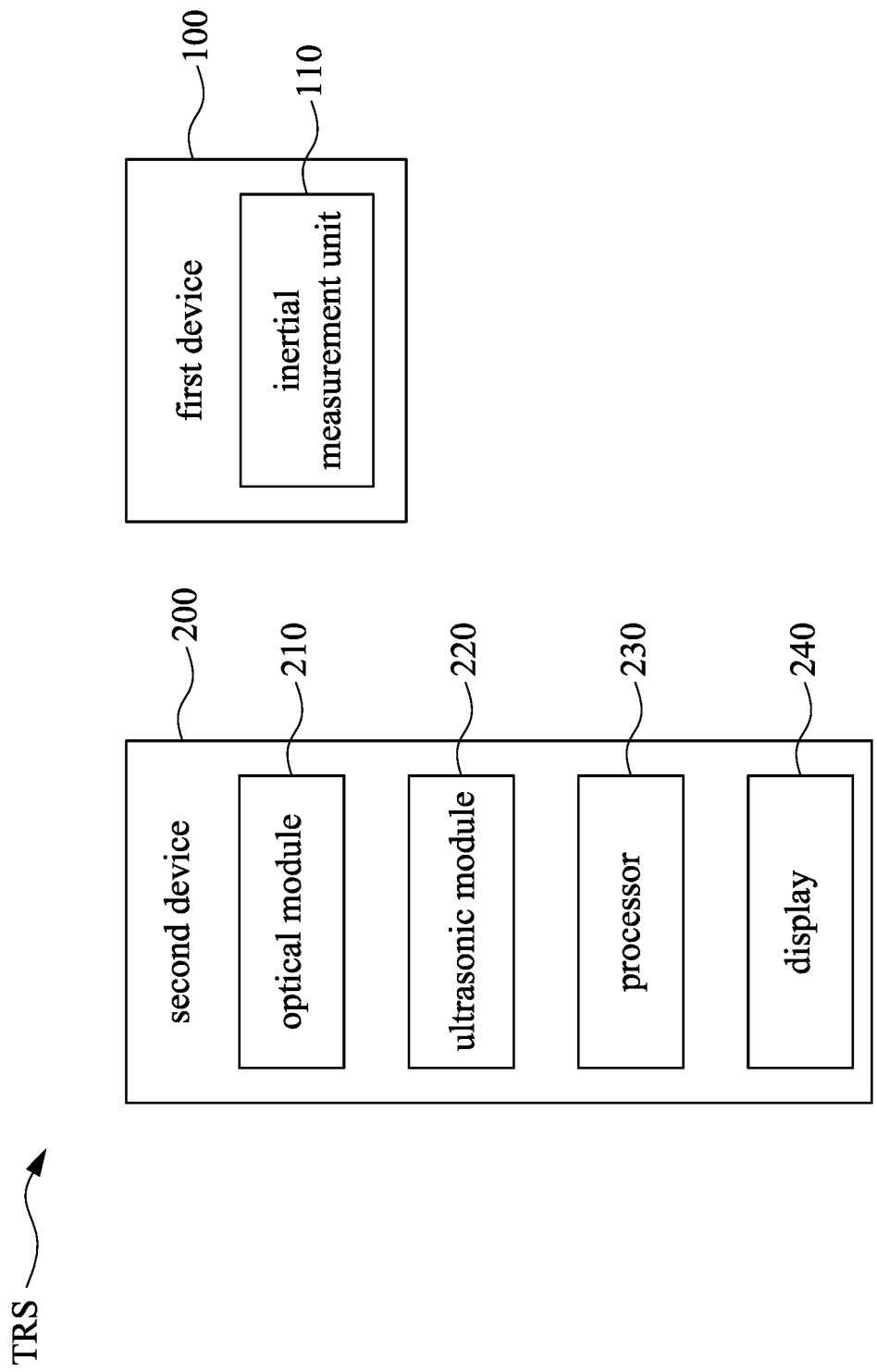
FIG. 1 is a schematic diagram of a tracking system illustrated according to one embodiment of present disclosure.

Reference will now be made in detail to the present embodiments of the disclosure, examples of which are illustrated in the accompanying drawings. Wherever possible, the same reference numbers are used in the drawings and the description to refer to the same or like parts.

As used herein, the terms "comprising," "including," "having," and the like are to be understood to be open-ended, i.e., to mean including but not limited to.

Reference throughout the specification to "one embodiment" or "an embodiment" means that a particular feature, structure, implementation, or characteristic described in connection with the embodiment is included in at least one embodiment of the present disclosure. Thus, uses of the phrases "in one embodiment" or "in an embodiment" in various places throughout the specification are not necessarily all referring to the same embodiment. Furthermore, the particular features, structures, implementation, or characteristics may be combined in any suitable manner in one or more embodiments.

FIG. 1 is a schematic diagram of a tracking system illustrated according to one embodiment of present disclosure. In the embodiment, the tracking system TRS includes a first device 100 and a second device 200. The first device 100 can be a hand-held controller of the tracking system TRS. The second device 200 can be a head-mounted display device, in which the second device 200 is configured to track the motion of the first device 100 with respect to the second device 200 when the tracking system TRS is in operation. It is noted, in some embodiment, a user can wear the second device 200 on his/her head and hold the first device 100 in his/her head. In this case, when the user moves the first device 100 with his/her head, the second device 200 can track the motion of the first device 100 and execute certain operations according to the motion of the first device 100.

As shown in FIG. 1, in the embodiment, the first device 100 includes an inertial measurement unit 110. The inertial measurement unit 110 is a sensor comprises gyros and accelerometers configured to detect angular accelerations and accelerations along at least six axes when the first device 100 is in operation. When the first device 100 is moved by the user, the inertial measurement unit 110 can detect angular accelerations and accelerations along these six axes of the first device 100, in which the angular accelerations and the accelerations can be used to generate an orientation of the first device 100.

As shown in FIG. 1, in the embodiment, the second device 200 includes an optical module 210, an ultrasonic module 220, a processor 230, and a display 240. The optical module 210, the ultrasonic module 220 and the display 240 are all electrically coupled to the processor 230. The optical module 210 can be a combination of some optical sensors and microprocessors that is configured to capture image data in a first detection field. When the first device 100 is in first detection field, the image data captured by the optical module 210 may contain information regarding the first device 100. The ultrasonic module 220 can be a combination of some ultrasonic transceivers and microprocessors. The ultrasonic module 220 is configured to send ultrasounds toward a second detection field and collect ultrasound reflections from the second detection field to generate ultrasonic data. When the first device 100 is in second detection field, the ultrasonic data collected by the ultrasonic module 220 may contain information regarding the first device 100.

In the embodiment, the processor 230 includes, for example, a single processing unit and a combination of plurality microprocessors electrically connected to internal or external memory via buses, in which the internal or external memory can be volatile or non-volatile memories. The processor 230 is configured to fetch a set of instructions from the internal or external memories, to execute the set of instructions, and to perform predetermined processes according to the instructions. The predetermined processes will be explained below.

In the embodiment, the optical module 210 can send the image data to the processor 230, and the ultrasonic module 220 can send the ultrasonic data to the processor 230 as well. After the processor 230 receives the image data and the ultrasonic data, the processor 230 can generate an integration data according to the image data and the ultrasonic data. It is noted, whether the first device 100 is detected in the first detection field or the second detection field, the processor 230 can determine a relative position of the first device 100 relative to the second device 200 based on the integration data. It should be noted, the integration data contain information regarding both the first and the second detection field, so a third detection field covered by the integration data is a detection field larger than the first detection field or the second detection field.

In the embodiment, the display 240 is electrically coupled to the processor 230. The processor 230 is further configured to send information about a simulated environment to the display 240 so that the display 240 can output a partial view of the simulated environment to the user based on the information. It should be noted, said simulated environment can be a computer technology that generates realistic images, sounds and other sensations to simulate the user's presence in a virtual or imaginary environment. Said simulated environment includes virtual reality environment, augmented reality environment or mixed reality environment. In the embodiment, when the user is wearing the second device 200, the display 240 can display the partial view of the simulated environment to the user. Through the partial view displayed by the display 240, the user can immerse in the simulated environment.

In some embodiment, the inertial measurement unit 110 of the first device 100 can communicate with the processor 230 via a signal transceiver (not shown in figure) settled on the first device 100, in which the signal transceiver can be a radio frequency transceiver or an infrared transceiver. Therefore, the inertial measurement unit 110 can send the orientation of the first device 100 to the processor 230. In this case, the processor 230 can illustrate a virtual object corresponding to the first device 100 in the simulated environment according to a combination of the relative position and the orientation. For example, if the user is playing a virtual reality game about adventures, the virtual object being displayed in the game environment can be a virtual hand holding a virtual sword, in which the virtual object is illustrated based on the relative position of first device 100 and the orientation of first device 100. As such, by tracking the relative position of first device 100 and the orientation of first device 100, the processor 230 can illustrate the virtual hand at the position that the first device 100 is located, and illustrate the virtual sword pointing to the orientation that the first device 100 is pointed.

Figure 2A:
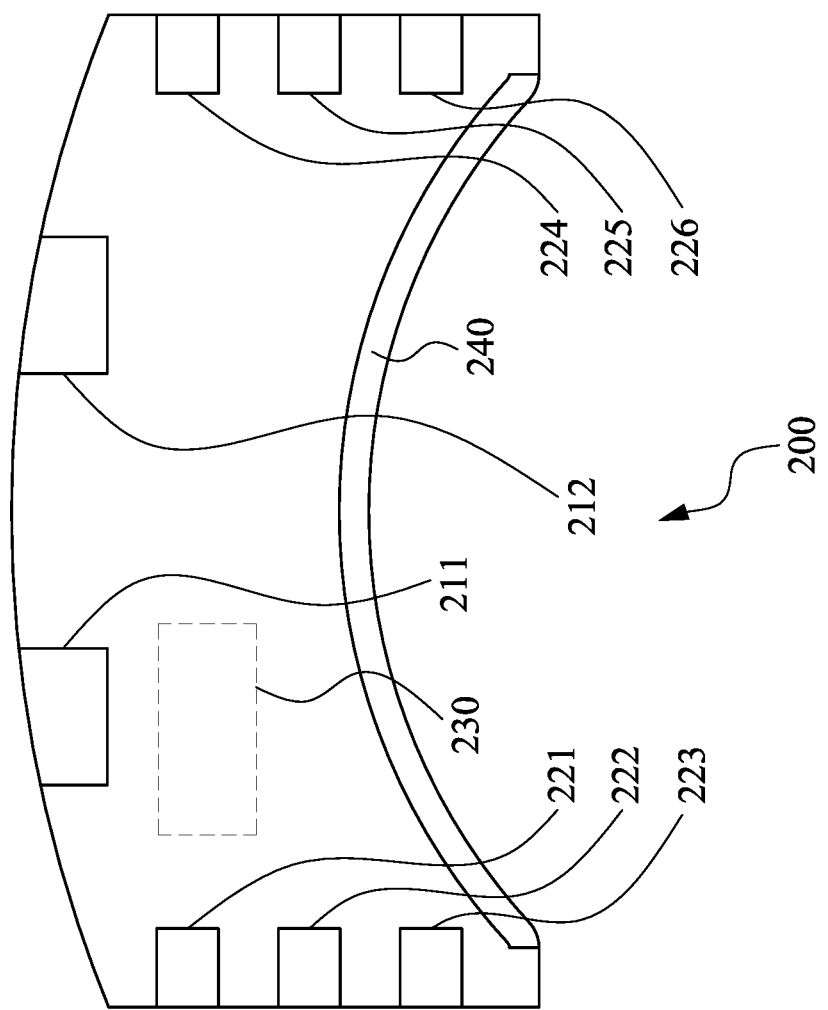
FIG. 2A is a schematic diagram of a tracking system of the tracking system illustrated according to one embodiment of present disclosure.

FIG. 2A is a schematic diagram of a tracking system of the tracking system illustrated according to one embodiment of present disclosure. In the embodiment, a detail configuration of the second device 200 in the tracking system TRS of FIG. 1 is illustrated in FIG. 2A. The figure shows an above view of the second device 200, which is a head-mounted display device. As shown in FIG. 2A, the optical module 210 shown in FIG. 1 includes two optical sensors, which are a first optical sensor 211 and a second optical sensor 212. It can be seen that the first optical sensor 211 and the second optical sensor 212 are disposed on a front surface of the second device 200 in parallel. As shown in FIG. 2A, the ultrasonic module 220 shown in FIG. 1 includes ultrasonic transceivers, in which the six ultrasonic transceivers are grouped as two ultrasonic arrays. Three among the six ultrasonic transceivers, the ultrasonic transceivers 221-223, are grouped as a first ultrasonic array, which is disposed on the left lateral of the second device 200. Another three ultrasonic transceivers, the ultrasonic transceivers 224-226, are grouped as a second ultrasonic array, which is disposed on the right lateral of the second device 200.

It is noticed that, an number of the ultrasonic transceivers in the first ultrasonic array or the second ultrasonic array is not limited to three transceivers as shown in FIG. 2A. In another embodiment, a number of the ultrasonic transceivers in the first ultrasonic array or the second ultrasonic array can include more than three transceivers to increase accuracy of ultrasonic detection.

Figure 2B:
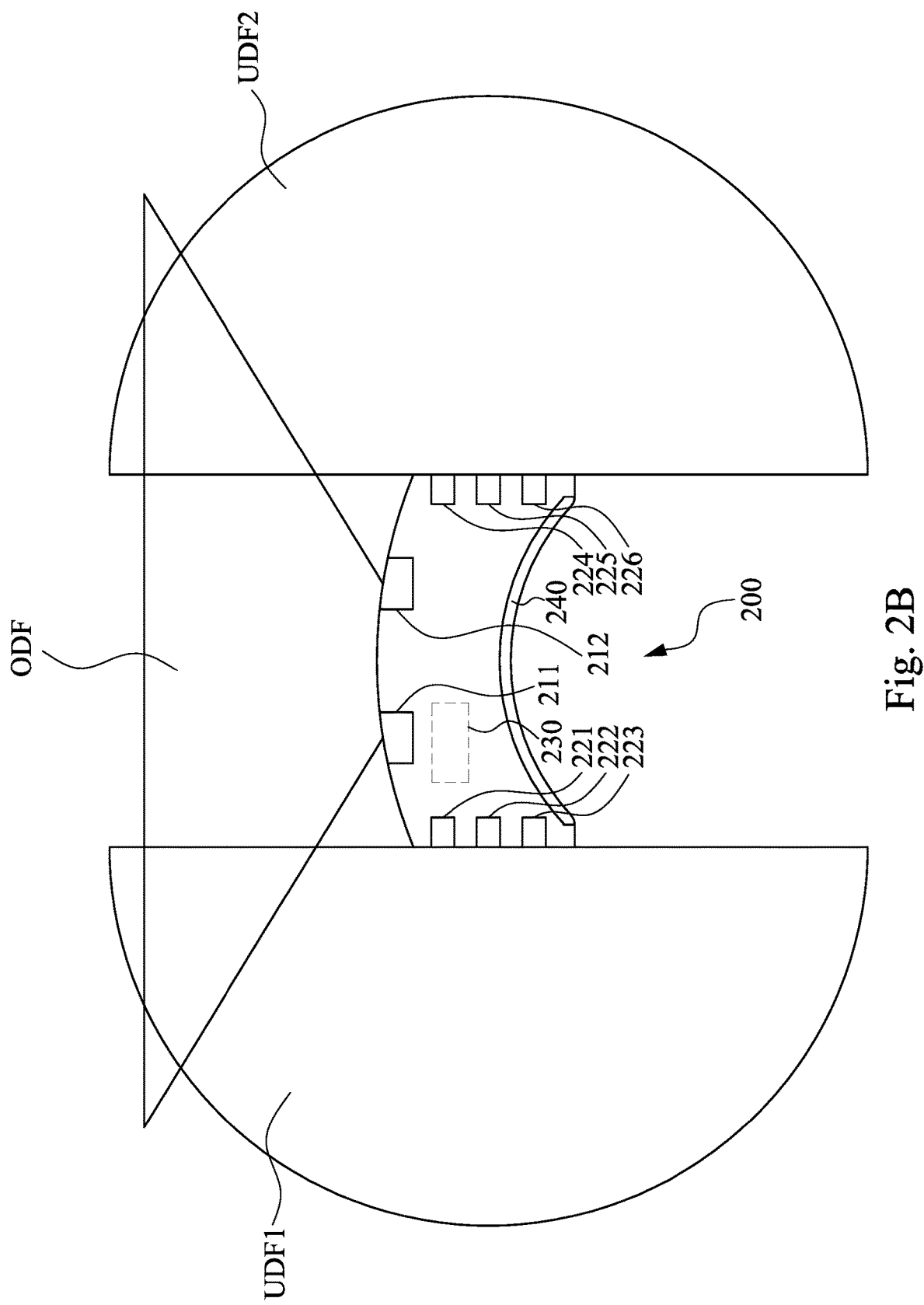
FIG. 2B is a schematic diagram of a tracking system and the detection fields of the tracking system illustrated according to one embodiment of present disclosure.

FIG. 2B is a schematic diagram of a tracking system and the detection fields of the tracking system illustrated according to one embodiment of present disclosure. In the embodiment, a combination of the first optical sensor 211 and the second optical sensor 212 has an optical detection field ODF. It means that the first optical sensor 211 and the second optical sensor 212 are both configured to capture image data in the optical detection field ODF. Whether the first device 100 mentioned in FIG. 1 is detected by the first optical sensor 211 or the second optical sensor 212, the image data obtained by the optical module 210 may contain information regarding the first device 100.

In the foregoing embodiment, the optical module 210 includes the first optical sensor 211 and the second optical sensor 212. It can be seen in the figure, the combination of the first optical sensor 211 and the second optical sensor 212 is capable of detecting the first device 100 in the optical detection field ODF. However, the configuration of the optical module 210 is not limited thereto. It some embodiments, the optical module 210 may comprise a single optical sensor disposed at the center of the front end of the second device, in which the single optical sensor has an optical detection. When the first device 100 mentioned in FIG. 1 is detected in the optical detection field, the image data obtained by the optical module 210 may contain information regarding the first device 100.

In the embodiment, in can be seen in the figure, the first ultrasonic transceiver 221, the second ultrasonic transceiver 222 and the third ultrasonic transceiver 223 are in combination to collect ultrasound data in a first ultrasonic detection field UDF1. On the other side, the fourth ultrasonic transceiver 224, the fifth ultrasonic transceiver 225 and the sixth ultrasonic transceiver 226 are in combination to collect ultrasound data in a second ultrasonic detection field UDF2. In the embodiment, the ultrasonic detection fields UDF1-UDF2 are in combination to form the second detection field as mentioned in the embodiment of FIG. 1. Whether the first device 100 mentioned in FIG. 1 is detected in any of the ultrasonic detection fields UDF1-UDF2, the ultrasonic data collected by the ultrasonic module 220 may contain information regarding the first device 100.

It is noted, as mentioned in the embodiment of FIG. 1, the processor 230 of the second device 200 can retrieve the ultrasonic data collected by the ultrasonic module 220 and the image data obtained by the optical module 210. In this case, as shown in FIG. 2B, when the first device 100 is located in the optical detection field ODF, it is the optical module 210 that tracks the position of the first device 100. When the first device 100 is located in the ultrasonic detection fields UDF1-UDF2, it is the ultrasonic module 220 that tracks the position of the first device 100. When the first device 100 is located in the overlapped fields of the ultrasonic detection fields UDF1-UDF2 and the optical detection field ODF, both the optical module 210 and the ultrasonic module 220 can track the position of the first device 100. It is to say, the combination of the optical module 210 and the ultrasonic module 220 provides availability for the processor 230 to track the position of the first device 100 in a range that is larger than the optical detection field ODF and the ultrasonic detection fields UDF1-UDF2.

It is noted, although the detection accuracy and efficiency of the optical sensor is good, it can produce high electricity consumption and high computational workloads. Moreover, the field of view limitation of the optical sensor can be another problem. Therefore, a combination of the optical sensors and ultrasonic transceivers can generate a larger detection field with lower electricity consumption and computational workloads. On the other hand, if the second device 200 is applied as a head-mounted display to output simulated environments, the virtual object corresponding to the first device 100 will be displayed in simulated environments when the first device 100 is detected in the optical detection fields. It is known, the users will be sensitive to the slight changes when the image data being captured in the optical detection fields is changing, so it requires higher accuracy for illustrating the positions of the first device 100 in the optical detection fields. On the other hand, in the fields that the users cannot observe, present disclosure provides an approach to track the first device 100 with ultrasounds in these fields. Therefore, the accuracy and efficiency of the entire system can be increased.

Figure 3:
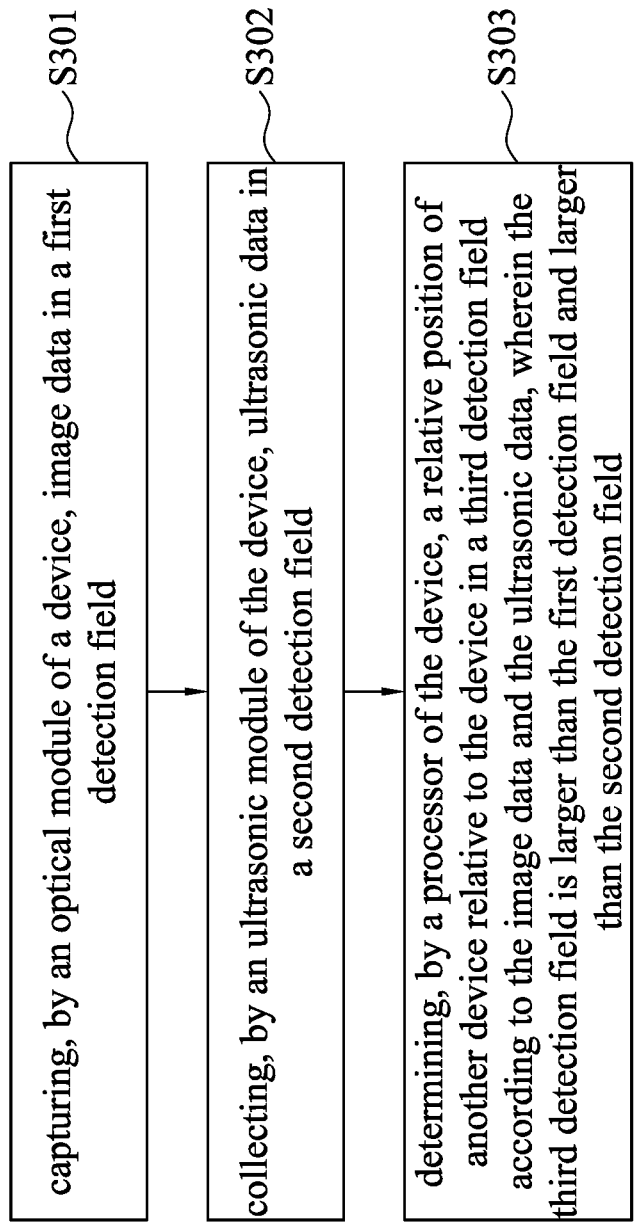
FIG. 3 is a flow chart of a tracking method illustrated according to one embodiment of present disclosure.

FIG. 3 is a flow chart of a tracking method illustrated according to one embodiment of present disclosure. In the embodiment, the tracking method 300 can be executed by the tracking system TRS shown in foregoing embodiments, and the references to the embodiments are herein incorporated. In the embodiment, the steps of the tracking method 300 will be listed and explained in detail in following segments.

Step S301: capturing, by an optical module of a device, image data in a first detection field. As described in the embodiment of FIG. 1, FIG. 2A and FIG. 2B, the optical module 210 of the second device 200 includes two optical sensors, and each of the optical sensors 211-212 is configured to capture image data in the optical detection field ODF. The image data captured by the optical module 210 can be sent to the processor 230 of the second device 200.

Step S302: collecting, by an ultrasonic module of the device, ultrasonic data in a second detection field. As described in the embodiment of FIG. 1, FIG. 2A and FIG. 2B, the ultrasonic module 220 of the second device 200 includes six ultrasonic transceivers 221-226. Each of the ultrasonic transceivers 221-223 is configured to capture ultrasonic data in the first ultrasonic detection field UDF1, respectively. Each of the ultrasonic transceivers 224-226 is configured to capture ultrasonic data in the second ultrasonic detection field UDF2, respectively. The ultrasonic data captured by the ultrasonic module 220 can be sent to the processor 230 of the second device 200.

Step S303: determining, by a processor of the device, a relative position of another device relative to the device in a third detection field according to the image data and the ultrasonic data, wherein the third detection field is larger than the first detection field and larger than the second detection field. As described in the embodiment of FIG. 1, FIG. 2A and FIG. 2B, when the processor 230 receives the image data and the ultrasonic data, the processor 230 can determine a relative position between the first device 100 and the second device 200 based on the image data and the ultrasonic data. It is to say, present disclosure provides a solid approach to track the first device 100 in an omnidirectional range by combining the optical module 210 and the ultrasonic module 220. The processes that the processor 230 determines the relative position will be described in following paragraphs.

Figure 4:
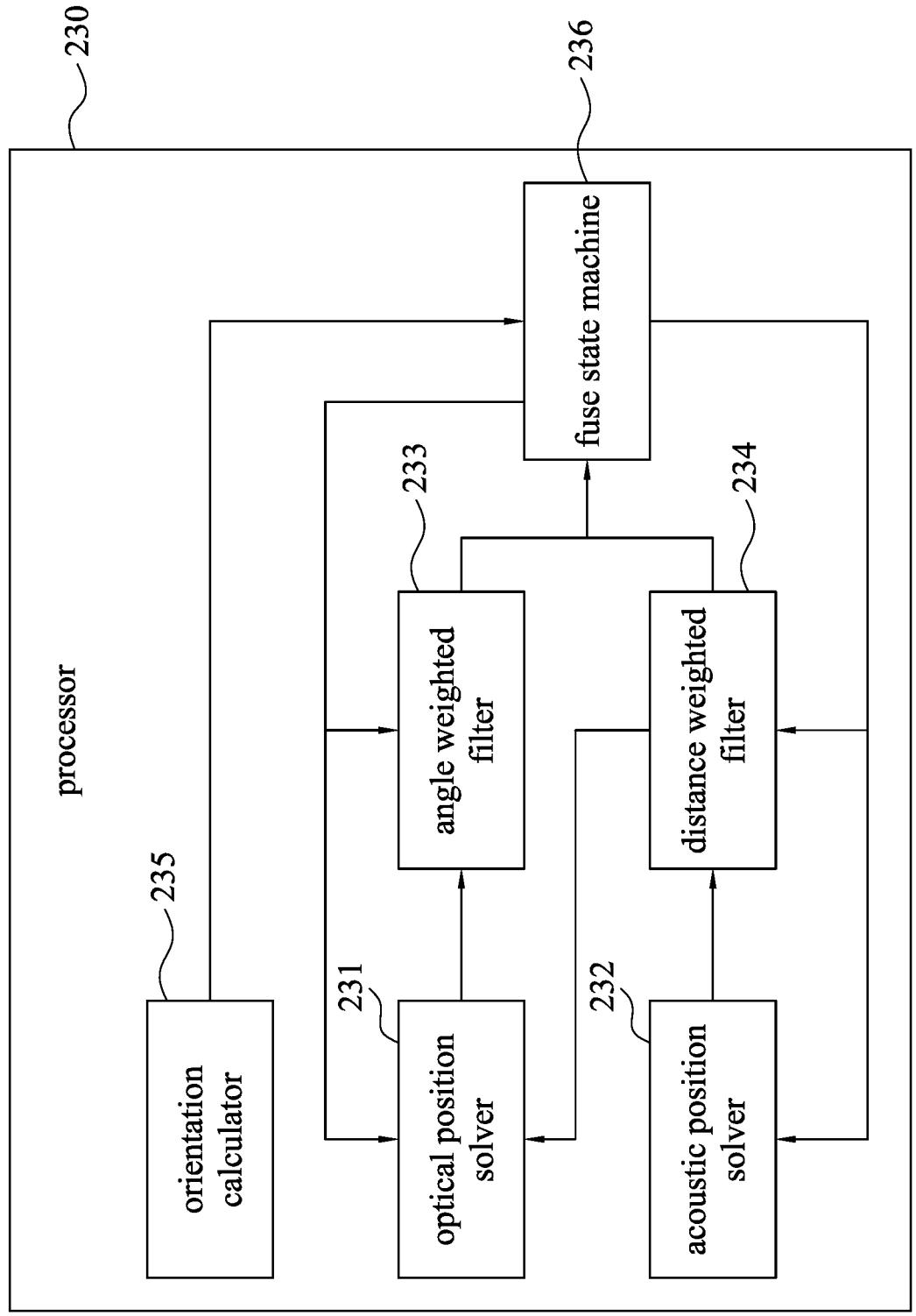
FIG. 4 is a schematic diagram shows a processor of a tracking system according to one embodiment of present disclosure.

FIG. 4 is a schematic diagram shows a processor of a tracking system according to one embodiment of present disclosure. The figure illustrates the detail configuration of the processor 230 as mentioned in foregoing embodiments. As such, the references to the foregoing embodiments are herein incorporated. The processor 230 includes an optical position solver 231, an acoustic position solver 232, an angle weighted filter 233, a distance weighted filter 234, an orientation calculator 235, and a fuse state machine 236. These solvers, filters, calculators, and state machine are operation units of the processor 230. When the processor 230 executes the instructions fetched from the memories, these operation units can perform predetermined processes described below. In some embodiments, the solvers, filters, calculators, and state machine are programs executed by the processor 230. When the processor 230 executes the instructions fetched from the memories, these programs can perform predetermined processes described below.

As mentioned, when the first device 100 is detected in the optical detection field ODF, the image data captured by the first optical sensor 211 or the second optical sensor 212 contains the information regarding the position of the first device 100. It is noted, in some embodiments, the first optical sensor 211 and the second optical sensor 212 are configured to recognize an optical detectable area settled on the first device 100, when the optical detectable area of the first device 100 is detected in the optical detection fields ODF, the image data captured by the optical sensors 211-212 may include the position the first device 100.

In the embodiment, the optical position solver 231 is configured to receive the image data captured by the first optical sensor 211 and the second optical sensor 212. Then, the optical position solver 231 can generate an optical-solved position of the first device 100 according the image data.

In the embodiment, the angle weighted filter 233 is configured to perform a weight calculation to the optical-solved position generated by the optical position solver 231. As mentioned, the first optical sensor 211 and the second optical sensor 212 form the optical detection field ODF. When first device 100 is located in the optical detection field ODF, the first device 100 can be detected by the first optical sensor 211 or the second optical sensor 212. However, it is noted, the optical sensor has its limitations. Typically, if the first device 100 is located at the middle of the optical detection field ODF, the first optical sensor 211 or the second optical sensor 212 can detect the first device 100 with high accuracy. However, if the first device 100 is located around the edge of the optical detection field ODF, the accuracy that the first optical sensor 211 or the second optical sensor 212 detects the first device 100 is relatively lower. Therefore, the weight calculation is applied to the optical-solved positions generated by the optical position solver 231 to ameliorate the accuracy of the optical-solved positions being detected. In the embodiment, the angle weighted filter 233 can assign an optical weight to the optical-solved position in the weight calculation.

Figure 5A:
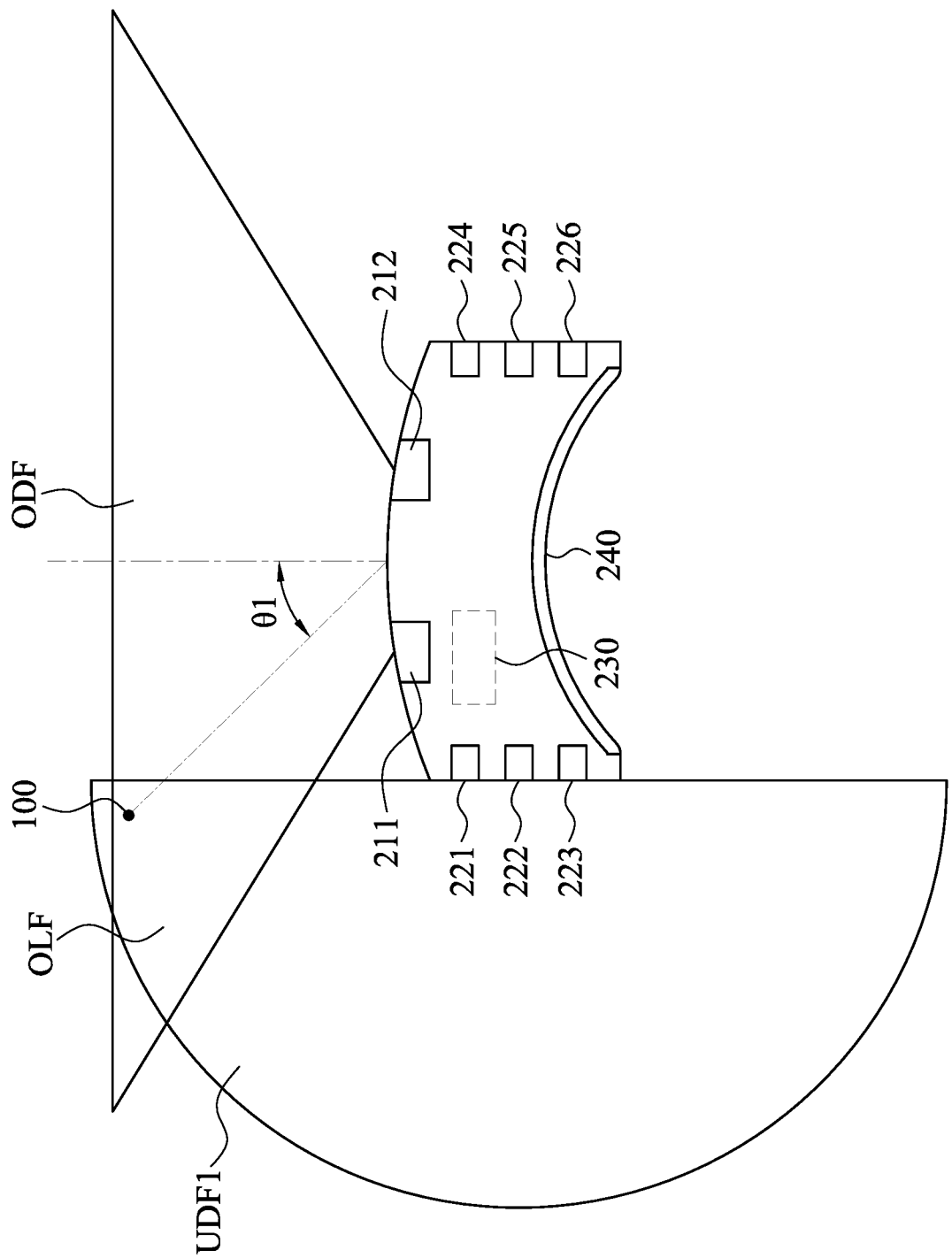
FIG. 5A is a schematic diagram showing the tracking system operates in some optical detection fields according to one embodiment of present disclosure.

FIG. 5A is a schematic diagram showing the tracking system operates in some optical detection fields according to one embodiment of present disclosure. It can be seen in FIG. 5A that, in the embodiment, the first device 100 is detectable at a first position within an overlapped field OLF between the optical detection field ODF and the first ultrasonic detection fields UDF1. In the embodiment, the first optical sensor 211 and the second optical sensor 212 can capture first image data, and the optical position solver 231 can generate a first optical-solved position of the first device 100 according the first image data. And the angle weighted filter 233 can calculate a first angle θ1 between a normal axis of the optical module 210 (which includes the first optical sensor 211 and the second optical sensor 212) and a line extended from the optical module 210 to the first device 100. In this case, the angle weighted filter 233 can determine a first optical weight for the first optical-solved position according to the first angle θ1.

Figure 5B:
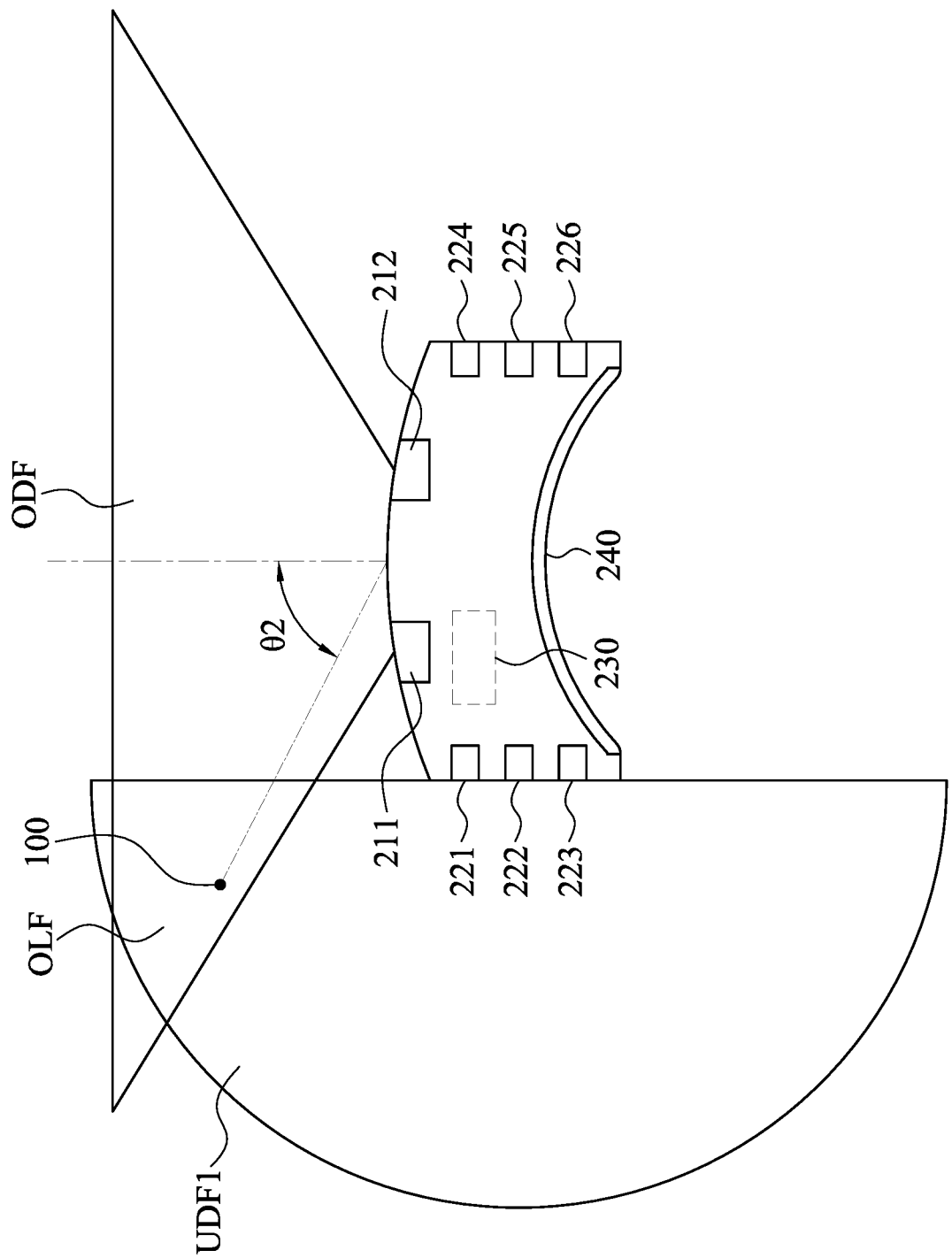
FIG. 5B is a schematic diagram showing the tracking system operates in some optical detection fields according to one embodiment of present disclosure.

FIG. 5B is a schematic diagram showing the tracking system operates in some optical detection fields according to one embodiment of present disclosure. As shown in FIG. 5B, in the embodiment, the first device 100 is detectable at a second position within the overlapped field OLF between the optical detection field ODF and the first ultrasonic detection fields UDF1 as well. In the embodiment, the first optical sensor 211 and the second optical sensor 212 can capture second image data, and the optical position solver 231 can generate a second optical-solved position of the first device 100 according the second image data. The angle weighted filter 233 can calculate a second angle θ2 between the normal axis of the optical module 210 (which includes the first optical sensor 211 and the second optical sensor 212) and another line extended from the optical module 210 to the first device 100. In this case, the angle weighted filter 233 can determine a second optical weight for the second optical-solved position according to the first angle θ1.

Comparing FIG. 5A with FIG. 5B, it is clear that the first angle 81 is smaller than the second angle 82, which means the first device 100 shown in FIG. 5B is much closer to the edge of the optical detection field ODF. In this case, when the weight calculation is performed, the first optical weight being determined by the angle weighted filter 233 in the embodiment of FIG. 5A will be larger than the second optical weight being determined by the angle weighted filter 233 in the embodiment of FIG. 5B. For example, the first optical weight being assigned to the first optical-solved position can be 0.70, and the second optical weight being assigned to the second optical-solved position can be 0.30. In the embodiment of FIG. 5A, the angle weighted filter 233 can multiply the first optical-solved position with the first optical weight to generate a weighted optical-solved position for the first device 100 in the weight calculation. In the embodiment of FIG. 5B, the angle weighted filter 233 can multiply the second optical-solved position with the second optical weight to generate another weighted optical-solved position for the first device 100 in the weight calculation. Clearly, because the first optical weight is larger than the second optical weight, the weighted optical-solved position being generated in the embodiment of FIG. 5A would be larger than the weighted optical-solved position being generated in the embodiment of FIG. 5B. It is to say, if the first device 100 is being detected far from the normal axis of the optical module 210, the angle weighted filter 233 determines a relative smaller optical weight for the optical-solved position of the first device 100.

However, it is noted, the assignation of the optical weights to optical-solved positions shown in above embodiments are merely examples, the values of the optical weights are subject to change depends on different requirements of the system.

Reference is made to FIG. 4. In the embodiment of FIG. 4, when the first device 100 is detected in each of the ultrasonic detection fields UDF1-UDF2, the ultrasonic data captured by the corresponding ultrasonic transceivers 221-226 may contain the information regarding the position of the first device 100. In the embodiment, the acoustic position solver 232 is configured to receive the ultrasonic data captured by the ultrasonic transceivers 221-226. Similar to the optical position solver 231, the acoustic position solver 232 is configured to generate acoustic-solved positions of the first device 100 according the ultrasonic data collected by the ultrasonic transceivers 221-226. For example, when the first device 100 is located in the detection field of the ultrasonic array disposed on the left lateral of the second device 200, the acoustic position solver 232 can generate an acoustic-solved position according the ultrasonic data collected by the ultrasonic transceivers 221-223.

In the embodiment, the distance weighted filter 234 is configured to perform a weight calculation to the acoustic-solved position generated by the acoustic position solver 232. Since the ultrasonic transceivers 221-223 form the first ultrasonic detection field UDF1, when the first device 100 is in the first ultrasonic detection fields UDF1, each of the ultrasonic transceivers 221-223 can detect the first device 100. The weight calculation applied by the distance weighted filter 234 is to ameliorate the accuracy of the acoustic-solved positions being detected. In the embodiment, the distance weighted filter 234 can assign an acoustic weight corresponding to the acoustic-solved position in the weight calculation.

Figure 6A:
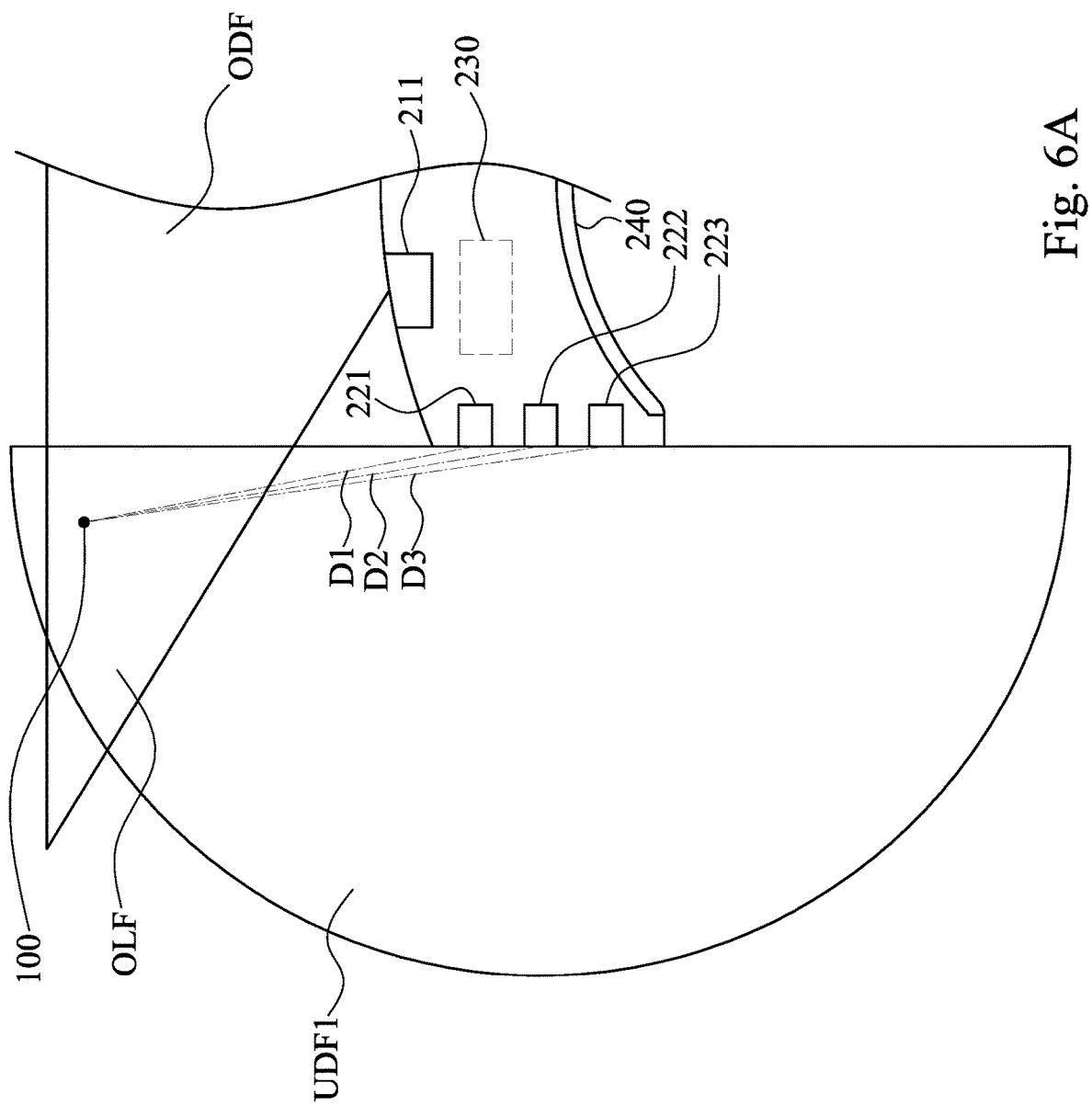
FIG. 6A is a schematic diagram shows the tracking system operates in some ultrasonic detection fields according to the embodiment of FIG. 5A.

FIG. 6A is a schematic diagram shows the tracking system operates in some ultrasonic detection fields according to the embodiment of FIG. 5A. The figure is illustrated to explain the weight calculation of the distance weighted filter 234. As shown in FIG. 6A, the first device 100 is ultrasonically detectable at the first position (the same position as shown in FIG. 5A) within the overlapped field OLF between the optical detection field ODF and the first ultrasonic detection field UDF1. In the embodiment, the ultrasonic transceivers 221-223 collect first ultrasonic data from the first ultrasonic detection field UDF1, and the first ultrasonic data is sent to the acoustic position solver 232. According to the first ultrasonic data, the acoustic position solver 232 can calculate a first distance D1 between the first device 100 and the first ultrasonic transceiver 221, a second distance D2 between the first device 100 and the second ultrasonic transceiver 222, and a third distance D3 between the first device 100 and the third ultrasonic transceiver 223. According to the distances D1-D3, the acoustic position solver 232 can obtain a first acoustic-solved position for the first device 100. However, the ultrasonic transceiver also has its limitations. Typically, if the first device 100 is located at the position closer to the ultrasonic transceivers 221-223, the acoustic-solved position being obtained by the acoustic position solver 232 is more accurate. On the other hand, if the first device 100 is located at the position far from the ultrasonic transceivers 221-223, the acoustic-solved position being obtained by the acoustic position solver 232 is relatively lower. Therefore, the weight calculation is applied to the acoustic-solved positions generated by the acoustic position solver 232 to ameliorate the accuracy of the acoustic-solved positions being detected.

It can be seen in the FIG. 6A that the first distance D1 is shorter than the second distance D2, and the second distance D2 is shorter than the third distance D3. In this case, in the weight calculation, the distance weighted filter 234 determines a first acoustic weight for the first acoustic-solved position based on the average distance from the first device 100 to the ultrasonic transceivers 221-223.

Figure 6B:
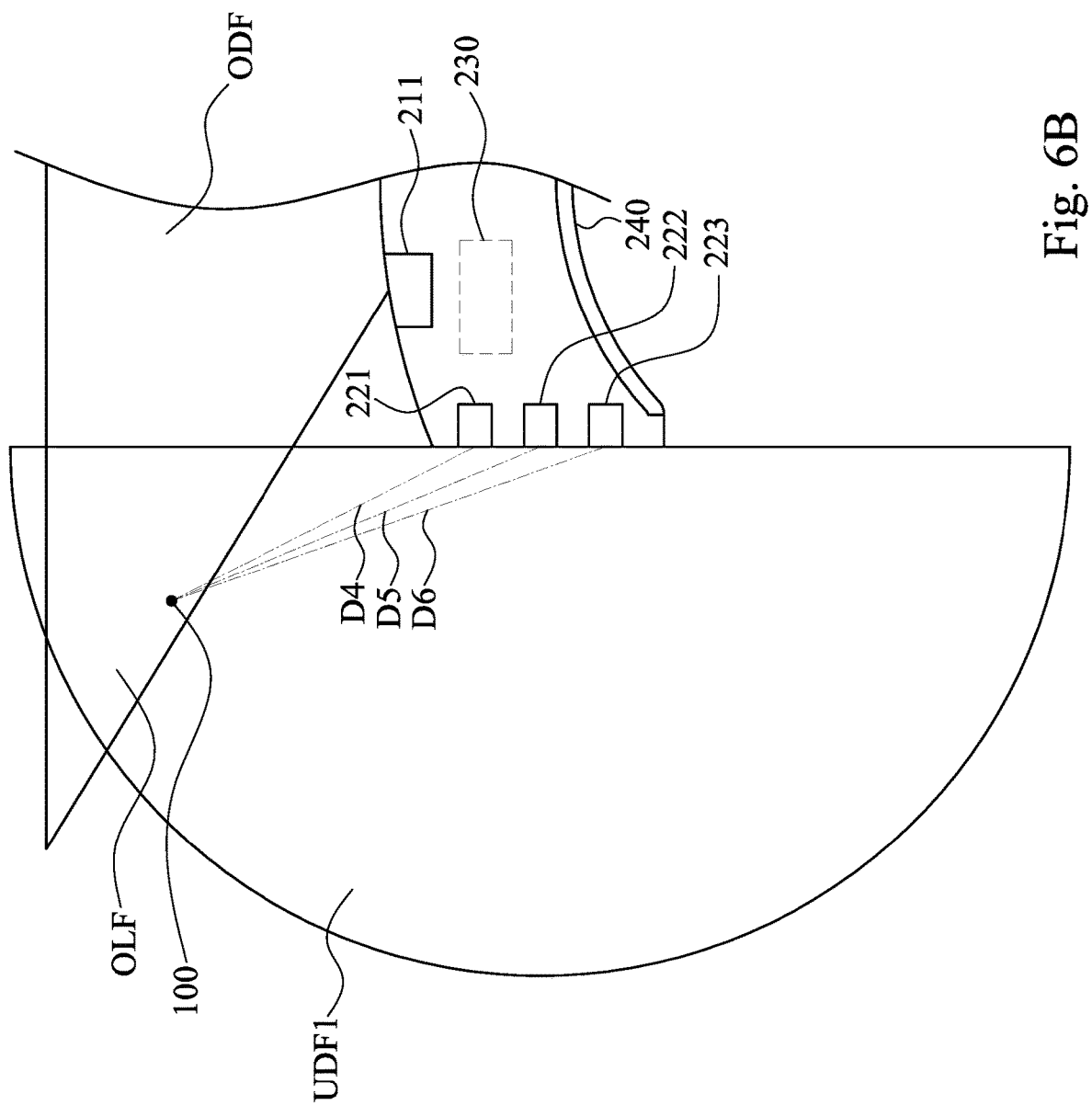
FIG. 6B is a schematic diagram shows the tracking system operates in some ultrasonic detection fields according to the embodiment of FIG. 5B.

FIG. 6B is a schematic diagram shows the tracking system operates in some ultrasonic detection fields according to the embodiment of FIG. 5B. The figure is illustrated to explain the weight calculation of the distance weighted filter 234 as well. As shown in FIG. 6B, the first device 100 is ultrasonically detectable at the second position (the same position as shown in FIG. 5B) within the overlapped field OLF between the optical detection field ODF and the first ultrasonic detection fields UDF1. In the embodiment, the ultrasonic transceivers 221-223 collect second ultrasonic data from the first ultrasonic detection field UDF1, and the second ultrasonic data is sent to the acoustic position solver 232. According to the second ultrasonic data, the acoustic position solver 232 can calculate a fourth distance D4 between the first device 100 and the first ultrasonic transceiver 221, a fifth distance D5 between the first device 100 and the second ultrasonic transceiver 222, and a sixth distance D6 between the first device 100 and the third ultrasonic transceiver 223. According to the distances D4-D6, the acoustic position solver 232 can obtain a second acoustic-solved position for the first device 100. As mentioned, the ultrasonic transceiver also has its limitations. Therefore, the weight calculation is applied to the second acoustic-solved position generated by the acoustic position solver 232 to ameliorate the accuracy of the acoustic-solved positions being detected.

It can be seen in FIG. 6B that the fourth distance D4 is shorter than the fifth distance D5, and the sixth distance D6 is shorter than the fifth distance D5. In this case, in the weight calculation, the distance weighted filter 234 determines a second acoustic weight for the second acoustic-solved position based on the average distance from the first device 100 to the ultrasonic transceivers 221-223 as well.

Comparing FIG. 6A with FIG. 6B, it is clear that the average distance of the distances D1-D3 is longer than the average distance of the distances D4-D6, which means the first device 100 shown in FIG. 6B is much closer to ultrasonic transceivers 221-223 than it is in FIG. 6A. In this case, when the weight calculation is performed, the first acoustic weight being determined by the distance weighted filter 234 in the embodiment of FIG. 6A will be smaller than the second acoustic weight being determined by the distance weighted filter 234 in the embodiment of FIG. 6B. For example, the first optical acoustic being assigned to the first acoustic-solved position can be 0.30, and the second acoustic weight being assigned to the second acoustic-solved position can be 0.70. In the embodiment of FIG. 6A, the distance weighted filter 234 can multiply the first acoustic-solved position with the first acoustic weight to generate a weighted acoustic-solved position for the first device 100 in the weight calculation. In the embodiment of FIG. 6B, the distance weighted filter 234 can multiply the second acoustic-solved position with the second acoustic weight to generate another weighted acoustic-solved position for the first device 100 in the weight calculation. Clearly, because the first acoustic weight is smaller than the second acoustic weight, the weighted acoustic-solved position being generated in the embodiment of FIG. 6A would be smaller than the weighted acoustic-solved position being generated in the embodiment of FIG. 6B. It is to say, if the first device 100 is being detected far from the ultrasonic module 220, the distance weighted filter 234 determines a relative smaller acoustic weight for the acoustic-solved position of the first device 100.

It is noted, the assignation of the weights to acoustic-solved positions shown in above embodiment is merely an example, the values of the acoustic weights are subject to change depends on different requirements of the system.

As mentioned in the embodiment of FIG. 1, the inertial measurement unit 110 can be used to detect an orientation of the first device 100. In the embodiment of FIG. 4, the orientation calculator 235 of the processor 230 is configured to retrieve the orientation of the first device 100 detected by the inertial measurement unit 110. When the orientation of the first device 100 is retrieved, the orientation calculator 235 can send the orientation to the fuse state machine 236. In the same manner, when the angle weighted filter 233 generates the weighted optical-solved position, the weighted optical-solved position is sent to the fuse state machine 236. When the distance weighted filter 234 generates the weighted acoustic-solved position, the weighted acoustic-solved position, is sent to the fuse state machine 236.

In the embodiment of FIG. 4, the fuse state machine 236 is configured to calculate the weighted optical-solved position and the weighted acoustic-solved position to generate a fused position. Since the optical module 210 and the ultrasonic module 220 are configured to obtain the image data and the ultrasonic data in the same timeline, so the weighted optical-solved position generated by the angle weighted filter 233 and weighted acoustic-solved position generated by the distance weighted filter 234 can be combined to generate the fused position correctly.

It is noted, whether the first device 100 is located in the optical detection field ODF or the ultrasonic detection fields UDF1-UDF2, as long as some of the optical sensors 211-212 and the ultrasonic transceivers 221-226 can detect the first device 100, the fuse state machine 236 can generate the fused position corresponding to the first device 100. More specifically, in one case, when the first device 100 can only be detected in the optical detection field ODF, the optical-solved position generated by the optical position solver 231 can be directly sent to the fuse state machine 236 without being weighted, and the fuse state machine 236 can generate the fused position according to the optical-solved position and the orientation of the first device 100. In another case, when the first device 100 can only be detected in the first ultrasonic detection field UDF1, the acoustic-solved position generated by the acoustic position solver 232 can be directly sent to the fuse state machine 236 without being weighted, and the fuse state machine 236 can generate the fused position according to the acoustic-solved position and the orientation of the first device 100. And, if the first device 100 can be detected in the overlapped field OLF, the fuse state machine 236 can generate the fused position as mentioned in foregoing embodiments.

In some embodiments, the fused position corresponding to the first device 100 can be feedback to the optical position solver 231, the acoustic position solver 232, the angle weighted filter 233, and the distance weighted filter 234. As such, since the optical position solver 231 and the acoustic position solver 232 have already received the fused position that indicates the previous position of the first device 100, the optical position solver 231 and the acoustic position solver 232 can calculate the following optical-solved positions and the acoustic-solved position in higher accuracy.

FIG. 7 is a schematic diagram shows the tracking system operates in combined detection fields according to one embodiment of present disclosure. The figure is illustrated to explain an approach to generate the optical-solved position in foregoing embodiments. In the embodiment, the weighted acoustic-solved position is feedback, by the distance weighted filter 234, to the optical position solver 231. For example, as shown in FIG. 7, when the first device 100 is entering, from the first ultrasonic detection field UDF1, to the overlapped field OLF between the first ultrasonic detection field UDF1 and the optical detection field ODF, the weighted acoustic-solved position is feedback to the optical position solver 231. When the optical position solver 231 calculates the optical-solved position according to the image data acquired by the first optical sensor 211 and the second optical sensor 212, the optical position solver 231 can determine the optical-solved position within a range originated from the weighted acoustic-solved position. It should be noted, in the same manner, when the first device 100 is moving from another ultrasonic detection field into the overlapped field between that ultrasonic detection field and any of the optical detection field, the weighted acoustic-solved position will be feedback to the optical position solver 231 as well, and the optical position solver 231 will determine the optical-solved position within a range originated from the weighted acoustic-solved position. It is to say, the feedback is a way to narrow down the possibilities of the optical-solved position when the first device 100 is moving from the ultrasonic detection fields UDF1-UDF2 to the optical detection field ODF.

It is noted, in the overlapped field between the ultrasonic detection fields UDF1-UDF2 and the optical detection field ODF, the accuracy of both the optical-solved positions and the acoustic-solved positions are relative lower; therefore, present disclosure provides an approach to combine both the results of the optical-solved positions and the acoustic-solved positions to generate better results. Typically, when the first device 100 is moving from the ultrasonic detection fields UDF1-UDF2 into the optical detection field ODF, the first device 100 can get into the optical detection field ODF from many possible directions. Therefore, it is difficult for the optical module 210 of the second device 200 to capture the first device 100 in the optical detection field ODF fast, and sometimes the user may even notice the loss of tracking. As such, present disclosure provides an approach for the optical module 210 to narrow down the potential optical-solved positions based on received acoustic-solved positions. Therefore, when the first device 100 is moving from the ultrasonic detection fields UDF1-UDF2 into the optical detection field ODF, with the acoustic-solved position, the optical module 210 can generate the optical-solved position of the first device 100 immediately.

As described above, the tracking system and the tracking method can be used to combine different optical sensors and ultrasonic transceivers to from an omnidirectional detection field. When the target of the detection is detected by several sensors or transceivers, the processor can perform the weigh calculation to improve the accuracy when generating the optical-solved positions and acoustic-solved positions. Moreover, when the target of the detection is moving from the ultrasonic detection fields to the optical detection fields, the feedback of the acoustic-solved positions makes the generation of the optical-solved positions faster.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A tracking system, comprising:
a first device; and
a second device, comprising:
an optical module, configured to capture image data in a first detection field;
an ultrasonic module, configured to collect ultrasonic data in a second detection field different from the first detection field; and
a processor, configured to determine a relative position of the first device relative to the second device in a third detection field according to at least one of the image data and the ultrasonic data,
wherein the third detection field is larger than the first detection field and larger than the second detection field,
wherein the processor is configured to calculate a first weighted position by a first weight according to the image data and a second weighted position according to the ultrasonic data, the processor is configured to calculate the relative position of the first device according to the first weighted position and the second weighted position when the first device is simultaneously detected in the first detection field and the second detection field,
wherein the ultrasonic module comprises at least three ultrasound transceivers, the processor is configured to calculate at least three distances from each of the at least three ultrasonic transceivers to the first device according to the ultrasonic data, the processor comprises an acoustic position solver, the acoustic position solver is configured to generate an acoustic-solved position of the first device according to the at least three distances, the processor calculates the acoustic-solved position with a second weight to generate the second weighted position,
wherein the second weight is negative correlated to an average distance of the at least three distances.

2. The tracking system of claim 1, wherein the first device is a controller and the second device is a head mounted display, and the second device is configured to display a simulated environment.

3. The tracking system of claim 2, wherein the first device comprises:
an inertial measurement unit configured to detect an orientation of the first device,
wherein the orientation of the first device is sent to the processor, the processor illustrates a virtual object corresponding to the first device in the simulated environment according to the relative position and the orientation.

4. The tracking system of claim 1, wherein the optical module comprises at least two optical sensors, the processor comprises an optical position solver, the optical position solver is configured to generate an optical-solved position of the first device according to the image data captured by the at least two optical sensors, the processor calculates the optical-solved position with the first weight to generate the first weighted position.

5. The tracking system of claim 4, wherein the processor calculates an angle between a normal axis of the at least two optical sensors and a line extending from a position between the at least two optical sensors to the first device, the first weight is negative correlated to the angle.

6. The tracking system of claim 1, wherein the first detection field and the second detection field are partially overlapped; and
when the second weighted position of the first device is entering the overlapped field, the processor generates the first weighted position within a range originated from the second weighted position.

7. A tracking device, comprising:
an optical module, configured to capture image data in a first detection field;
an ultrasonic module, configured to collect ultrasonic data in a second detection field different from the first detection field; and
a processor, configured to determine a relative position of a target device relative to the tracking device in a third detection field according to at least one of the image data and the ultrasonic data,
wherein the third detection field is larger than the first detection field and larger than the second detection field,
wherein the processor is configured to calculate a first weighted position according to the image data and a second weighted position according to the ultrasonic data, the processor is configured to calculate the relative position of the target device according to the first weighted position and the second weighted position when the target device is simultaneously detected in the first detection field and the second detection field,
wherein the ultrasonic module comprises at least three ultrasound transceivers, the processor calculates at least three distances from each of the at least three ultrasonic transceivers to the target device according to the ultrasonic data, the processor comprises an acoustic position solver, the acoustic position solver is configured to generate an acoustic-solved position of the target device according to the at least three distances, the processor calculates the acoustic-solved position with a second weight to generate the second weighted position,
wherein the second weight is negative correlated to an average distance of the at least three distances.

8. The tracking device of claim 7, wherein the first detection field and the second detection field are partially overlapped; and
when the second weighted position of the first device is entering the overlapped field, the processor generates the first weighted position within a range originated from the second weighted position.

9. A tracking method for tracking a first device by a second device, comprising:
capturing, by an optical module of the second device, image data in a first detection field;
collecting, by an ultrasonic module of the second device, ultrasonic data in a second detection field different from the first detection field;
determining, by a processor of the second device, a relative position of the first device relative to the second device in a third detection field according to at least one of the image data and the ultrasonic data, wherein the third detection field is larger than the first detection field and larger than the second detection field;
calculating, by the processor, a first weighted position by a first weight according to the image data and a second weighted position according to the ultrasonic data;
calculating, by the processor, the relative position of the first device according to the first weighted position and the second weighted position when the first device is simultaneously detected in the first detection field and the second detection field;
calculating, by the processor, at least three distances from at least three ultrasonic transceivers of the ultrasonic module to the first device according to the ultrasonic data;
generating, by an acoustic position solver of the processor, an acoustic-solved position of the first device according to the at least three distances; and
calculating, by the processor, the acoustic-solved position with a second weight to generate the second weighted position, wherein the second weight is negative correlated to an average distance of the at least three distances.

10. The tracking method of claim 9, further comprising:
displaying, by a display of the second device, a simulated environment;
receiving, by the processor, an orientation of the first device; and
illustrating, by the processor, a virtual object corresponding to the first device in the simulated environment according to the relative position and the orientation.

11. The tracking method of claim 9, further comprising:
generating, by an optical position solver of the processor, an optical-solved position of the first device according to the image data captured by at least two optical sensors of the optical module; and
calculating, by the processor, the optical-solved position with the first weight to generate the first weighted position.

12. The tracking method of claim 11, further comprising:
calculating, by the processor, an angle between a normal axis of the at least two optical sensors and a line extending from a position between the at least two optical sensors to the first device, wherein the first weight is negative correlated to the angle.

13. The tracking method of claim 9, further comprising:
when the second weighted position of the first device is entering an overlapped field between the first detection field and the second detection field, generating, by the processor, the first weighted position within a range originated from the second weighted position.

* * * * *